3,342,111
FLUID PRESSURE ACTUATOR AND LOCKING MEANS

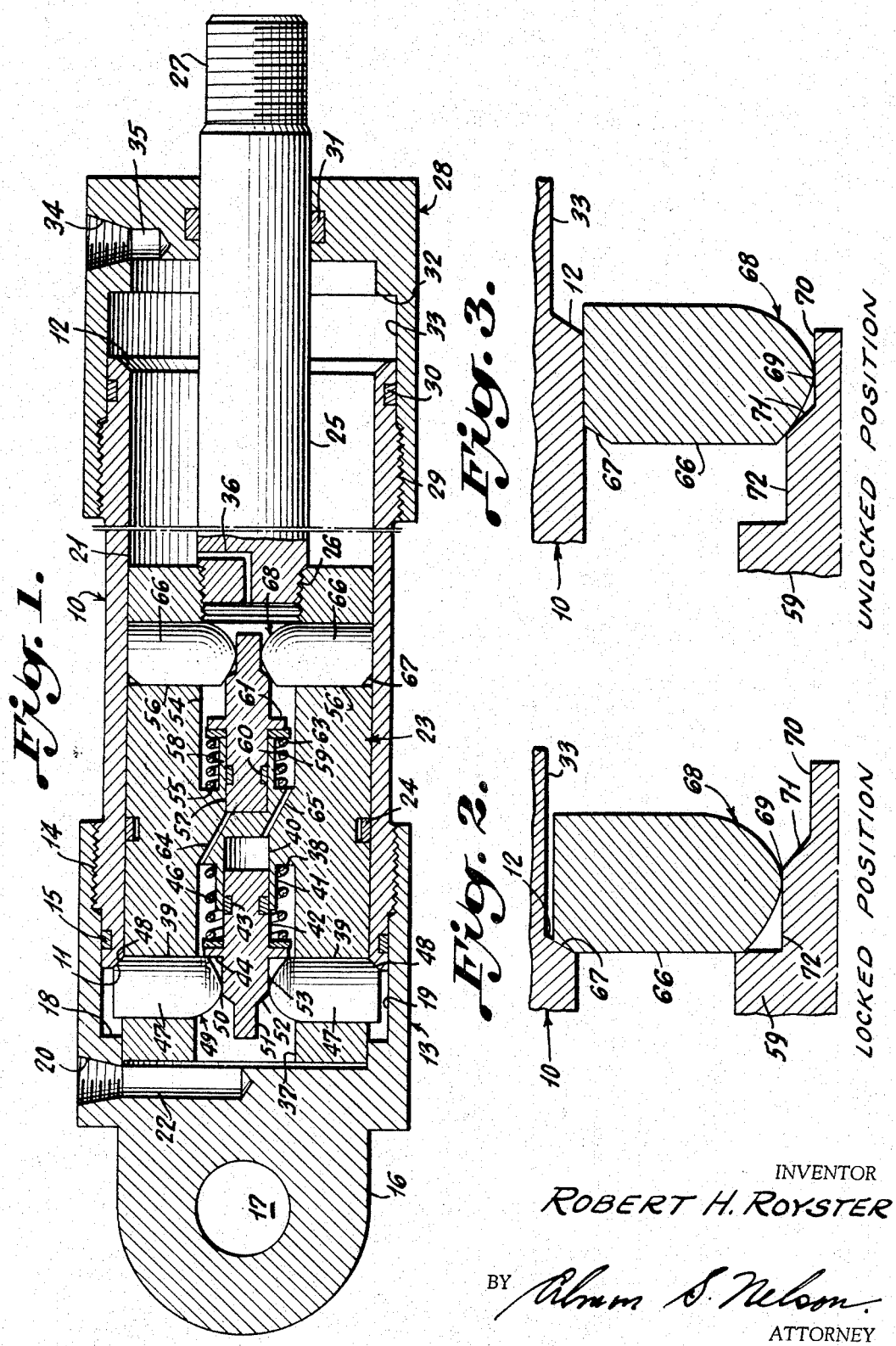

Robert H. Royster, 1436 Serenade Terrace, Corona Del Mar, Calif. 92625
Original application Oct. 21, 1963, Ser. No. 317,760, now Patent No. 3,217,609, dated Nov. 16, 1965. Divided and this application Sept. 8, 1965, Ser. No. 485,741
6 Claims. (Cl. 92—24)

This application is a division of my co-pending application, Ser. No. 317,760, filed Oct. 21, 1963, now Patent No. 3,217,609, dated Nov. 16, 1965, which in turn is a continuation-in-part of application Ser. No. 109,885, filed May 15, 1961, now Patent No. 3,107,582, dated Oct. 22, 1963.

This invention relates to fluid pressure or hydraulically operated mechanism and more particularly to a fluid pressure actuator and locking means which may be utilized in the landing gear structure of aircraft or for any other application where it is desired to utilize fluid pressure actuated means for moving an element to a desired position and for thereafter locking the element in such position.

Heretofore numerous types of fluid pressure actuators incorporating locking means have been proposed and utilized particularly in connection with the aircraft industry and while these prior art devices have operated satisfactorily insofar as providing a motive force for moving an element from one position to another the locking means incorporated therein has given considerable trouble in that in general such prior art locking means has involved relatively delicate mechanisms and frequent failure thereof has been experienced. Moreover these prior art locking devices incorporated in fluid pressure actuators have been relatively complex and costly to manufacture and furthermore, repair thereof or replacement upon failure has also been relatively costly. Also, in some instances as the result of wear, play has developed between the parts of the locking mechanism which has sometimes resulted in failure to provide a positive lock with the result that inadvertent movement of the element operated by the fluid pressure actuator has taken place which in certain instances could be disastrous.

It is accordingly an object of the invention to provide a fluid pressure actuator and locking means which may be conveniently and economically constructed from readily available materials and which will provide a positive lock regardless of wear or play between the parts.

A further object of the invention is provision of a fluid pressure actuator and locking means in which the locking mechanism is relatively simple and eliminates the use of levers, thereby reducing likelihood of failure to a minimum.

A still further object of the invention is provision of a fluid pressure actuator and locking means in which the locking action is accomplished by a combination of spring means and fluid pressure means thereby providing for operation of the locking means by either the spring means or fluid pressure means in the event of failure of one or the other.

Another object of the invention is the provision of a fluid pressure actuator and locking means in which the entire operation of the device is controlled merely by the admission of fluid pressure thereto.

A further object of the invention is the provision of a fluid pressure actuator and locking means which may be constructed as a double acting or single acting device while still utilizing the same basic actuating and locking mechanisms.

A still further object of the invention is the provision of a fluid pressure actuator and locking means in which the locking means includes radially movable locking detents in the form of bolts and in which 1 bolt or 2, 3, 4 or more circumferentially spaced bolts may be utilized depending upon the size and load requirements while still utilizing the same basic locking mechanism.

Another object of the invention is the provision of a fluid pressure actuator and locking means in which the locking means includes radially movable locking detents actuated by locking cam means including inclined and flat surfaces in contact with suitable rounded surfaces of appropriate radius, all of the parts being in contact at all times and in compression, thereby providing a particularly strong structure and reducing the likelihood of failure.

A further object of the invention is the provision of a fluid pressure actuator and locking means constructed as a double acting device which will pull or push in either direction and in which the device may be locked in position at both ends of the stroke.

Further objects and advantages of the invention will be apparent in the following description taken in conjunction with the accompanying drawings wherein:

FIG. 1 is a longitudinal sectional view of a fluid pressure actuator and locking means constructed in accordance with this invention and showing the device locked in position at one end of the stroke;

FIG. 2 is a fragmentary sectional view showing the details of the locking means of FIG. 1 and with the locking detent in locked position; and FIG. 3 a fragmentary sectional view similar to FIG. 2 and showing the locking detent in unlocked position.

With continued reference to the drawings there is shown a double acting fluid pressure actuator and locking means constructed in accordance with this invention and which may well comprise an elongated hollow cylinder 10, the end surfaces 11 and 12 of which are beveled outwardly. A cylinder head 13 is secured by screw threaded or other suitable means 14 to one end of the cylinder 10 and suitable packing means 15 may be provided between the cylinder head 13 and cylinder 10 in order to provide a fluid tight connection therebetween. The cylinder head 13 may be provided with an outwardly extending ear 16, having an aperture 17 therein for facilitating attachment of the device to a cooperating structure, and it is also to be noted that the cylinder head 13 is provided with an inner annular shoulder 18 spaced from the beveled end 11 of the cylinder 10 in order to provide an inwardly opening annular recess 19 between the cylinder head 13 and the beveled end 11 of the cylinder 10. The cylinder head 13 is also provided with a fluid pressure inlet 20 communicating with the bore 21 of the cylinder 10 through a passage 22 in the cylinder head 13.

A piston 23 is slidably received in the bore 21 of the cylinder 10 and suitable packing means 24 may be provided on the piston 23 for engaging the wall of the bore 21 in order to provide a fluid pressure seal therebetween. A piston rod 25 may be detachably secured by screw threaded or other suitable fastening means 26 to the piston 23, and the piston rod 25 projects from the opposite end of the cylinder 10 from the cylinder head 13, and piston rod 25 may be provided with screw threads 27 or other suitable means at the outer end thereof to facilitate attachment of the piston rod 25 to an element to be operated thereby.

A second cylinder head 28 is secured to the cylinder 10 opposite the cylinder head 13 by screw threaded or other suitable means 29, and suitable packing means 30 may be provided between the cylinder 10 and the cylinder head 28 in order to provide a fluid tight connection therebetween. The cylinder head 28 is also provided with suitable packing means 31 engaging the piston rod 25 in order to prevent leakage of fluid pressure therebetween while still providing for sliding movement of the piston rod 25.

An inner annular shoulder 32 formed on the cylinder head 28 is spaced from the adjacent beveled end 12 of the cylinder 10 in order to provide a second inwardly opening annular recess 33 at the opposite end of the cylinder 10 from the annular recess 19. The cylinder head 28 is provided with a second fluid pressure inlet 34 communicating through a passage 35 with the bore 21 of the cylinder 10. It is also to be noted that the inner end of the piston rod 25 is provided with a passage 36 communicating with the bore 21 of the cylinder 10, and opening inwardly of the inner end of the piston rod 25. The purpose of this passage 36 will be later described.

The piston 23 is provided at the end opposite the piston rod 25 with a central axial bore 37 terminating at a point 38 within the piston 23, and a plurality of radial apertures 39 are formed in piston 23 communicating with the bore 37 and opening radially outwardly of the piston 23. A second central axial bore 40 of smaller diameter than the bore 37 and concentric therewith, is provided in the piston 23, and as shown in FIG. 1 the bores 37 and 40 are so formed as to provide a sleeve 41 therebetween. A plunger 42 is slidably disposed in the bore 40 and the plunger 42 may be provided with suitable packing means 43 engaging the wall of the bore 40 to provide a fluid tight engagement therebetween. An annular flange 44 is provided on the plunger 42, and engaging the rear surface of the flange 44 at the outer end of a compression spring 46 received in the bore 37 with the inner end of the spring 46 engaging the inner end 38 of the bore 37.

Locking detents in the form of cylindrical bolts 47 are slidably disposed in the apertures 39 and the outer ends of the detents 47 are provided with beveled surfaces 48 cooperating with the beveled end surface 11 on cylinder 10 and the detents 47 are formed with rounded inner ends 49 which provide nose portions 50 and the nose portions 50 in turn engage flat surfaces 51, inclined surfaces 52 and flat surfaces 53 on the plunger 42 depending upon the location of such plunger. The operation of the detents 47 and the plunger 42 will be described in connection with such structure at the opposite end of the piston 23 which is identical therewith.

A central axial bore 54 is provided in the opposite end of the piston 23 and the bore 54 terminates at a point 55 in the piston 23. A plurality of radial apertures 56 are provided in the piston 23 communicating with the bore 54 and opening radially outwardly of the piston 23. A second central axial bore 57 concentric with the bore 54 and of smaller diameter is provided in the piston 23 and as shown in FIG. 1 the relationship of bores 54 and 57 is such as to provide a sleeve 58 therebetween. Slidably received in the second bore 57 is a plunger 59 and suitable packing means 60 may be provided thereon engaging the wall of the bore 57 in order to provide a fluid tight connection therebetween. An annular flange 61 is provided on the plunger 59 and the inner side of the flange 61 is engaged by the outer end of a compression spring 63 disposed in the bore 54 and with the inner end of the spring 63 engaging the inner end 55 of the bore 54. A fluid pressure passage 64 is provided between the bore 37 and the bore 57 and a similar fluid pressure passage 65 is provided between the bore 40 and the bore 54. The purpose and operation of these passages 64 and 65 will be presently described.

Locking detents 66 in the form of cylindrical bolts are slidably received in the radial apertures 56 and the detents 66 are provided with beveled surfaces 67 on the outer ends thereof for cooperating with the beveled end surface 12 on the cylinder 10. As best shown in FIGURES 2 and 3 each locking detent 66 is formed on the inner end with a rounded surface 68 which serves to provide a rounded nose portion 69. The plunger 59 is provided on the outer end thereof with a flat surface 70 which merges into an upwardly and inwardly inclined surface 71 which terminates in a flat surface 72.

In FIG. 1 the piston 23 is shown locked in retracted position by engagement of the outer ends of the detents 47 with the beveled end surface 11 of cylinder 10 with the outer ends of the detents 47 disposed in the annular recess 19 and in order to operate the device to extend piston 25 it is only necessary to introduce fluid pressure through the inlet 20 and passage 22 into the bore 21 of the cylinder 10 at which time such fluid pressure will impinge on the flange 44 of the plunger 42 and urge such plunger inwardly of the bore 40 in the piston 43 against the action of spring 46 which will permit inward movement of the locking detents 47 by reason of the fact that the nose portion 50 on the detents 47 will move from the flat surfaces 53 on the plunger 42 inwardly down the inclined surfaces 52 and into engagement with the flat surfaces 51 to the position shown at the right hand of FIG. 1 and this inward movement of the detents 47 will serve to disengage the same from the beveled end surface 11 of the cylinder 10 thereby permitting movement of the piston 23 under the action of fluid pressure toward the right as viewed in FIG. 1.

When the piston 23 reaches the opposite end of the stroke, fluid pressure flowing through the passage 64 from the bore 37 to the bore 57 together with the compression spring 63 will urge the plunger 59 outwardly of the piston 23 which will result in the inclined surfaces 71 on the plunger 59 engaging the rounded nose portion 69 on the locking detents 66 which will result in outward movement of such detents until the nose portions 69 engage the flat surfaces 72 on the plunger 59. This movement of the detent 66 outwardly into the annular recess 33 results in engagement of the beveled ends 67 of the detents 66 with the beveled end 12 of the cylinder 10 thereby locking the piston 23 against movement toward the left as viewed in FIG. 1.

It is to be noted that engagement of the nose portion 69 of the detent 66 with the flat surfaces 72 on the plunger 59 prevents any inward movement of the locking detents 66 and furthermore all of the engaging elements are in compression.

When it is desired to return the piston 23 to the opposite end of the cylinder as shown in FIG. 1, it is only necessary to introduce fluid pressure through the fluid pressure inlet 34 and passage 35 to the bore 21 of the cylinder 10 at which time such fluid pressure will flow through the passage 36 in the piston rod 25 and impinge on the flange 61 of the plunger 59 to move the plunger inwardly of the piston 23 at which time the nose portions 69 of the detents 66 will move downwardly along the inclined surfaces 71 on the plunger 59 into engagement with the flat surfaces 70, thereby permitting inward movement of the locking detents 66 which will disengage the same from the beveled end surface 12 of the cylinder 10, thereby permitting return movement of the piston 23 under the action of fluid pressure in the cylinder 10. At the same time fluid pressure flowing through the passage 65 from the bore 54 to the bore 40 together with compression spring 46 will operate to move the plunger 42 outwardly and engagement of the nose portions 50 on the locking detents 47 with the inclined surfaces 52 on the plunger 42 will cause outward movement of the locking detents 47 to again lock the piston 23 in place at the left-hand end of the stroke as shown in FIG. 1.

While the operations of the plungers 42 and 59 has been described as resulting from fluid pressure flowing through the passages 64 or 65 in conjunction with the compression springs 46 and 63 it is to be understood that in the event of failure of either the compression spring 46 or 63 the fluid pressure will serve to operate the plunger 42 or 49 and also in the event one or more of the passages 64 or 65 becomes clogged the compression springs 46 or 63 will serve to actuate the plungers 42 or 49 to preform the locking action.

It will be seen that by the above described invention there is provided a relatively simple yet highly effective fluid pressure actuator and locking means in which the locking mechanism is relatively simple and strong, the structure being such as to eliminate all levers and also providing a structure which is substantially foolproof in that both compression springs and fluid pressure may be utilized either together or one in place of the other to operate the locking mechanism thereby reducing the likelihood of failure to a minimum and furthermore the structure of this invention may be utilized for providing either a double acting or a single acting fluid pressure actuator even though for purposes of illustration and simplification only a double acting actuator is shown and described in this application.

It will be obvious to those skilled in the arts that various changes may be made in the invention without departing from the spirit and scope thereof, and therefore the invention is not limited by that which is shown in the drawings that described in the specification, but only as indicated in the appended claims.

What is claimed is:

1. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, means on said head for attaching the same to a cooperating structure, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, locking detents slidably disposed in said radial apertures, beveled surfaces on the outer ends of said detents for engaging the beveled end surfaces on said cylinder and means for moving said detents outwardly and locking the same in outward position comprising a flat surface on the outer end of each plunger disposed at right angles to the longitudinal axis of each detent, each flat surface merging into an inwardly extending inclined cam surface, each cam surface terminating in a second flat surface disposed radially outward of said first flat surface and a rounded nose on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surface on said one plunger will move the associated detent outwardly into the adjacent annular recess to lock said piston against movement and movement of the nose portion on said last named detent into engagement with the second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement from the opposite end.

2. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, locking detents slidably disposed in said radial apertures, beveled surfaces on the outer ends of said detents for engaging the beveled end surfaces on said cylinder and means for moving said detents outwardly and locking the same in outward position comprising a flat surface on the outer end of each plunger disposed at right angles to the longitudinal axis of each detent, each flat surface merging into an inwardly extending inclined cam surface, each cam surface terminating in a second flat surface disposed radially outward of said first flat surface and a rounded nose portion on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surface on said one plunger will move the associated detent outwardly into the adjacent annular recess to lock said piston against movement and movement of the nose portion on said last named detent into engagement with said second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement from the opposite end.

3. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, plungers slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially otuwardly of said piston, locking detents slidably disposed in said radial apertures, beveled surfaces on the outer ends of said detents for engaging the beveled end surfaces on said cylinder and means for moving said detents outwardly and locking the same in outward position comprising a flat surface on the outer end of each plunger, each flat surface merging into an inwardly extending inclined cam surface, each cam surface terminating in a second flat surface disposed radially outward of said first flat surface and a rounded nose portion on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surfaces on said one plunger will move the associated detent outwardly into the adjacent annular recess to lock said piston against movement and movement of the nose portion on said last named detent into engagement with said second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement from the opposite end.

4. A double acting fluid pressure actuator and locking means comprising an elongated hollow cylinder, each end surface of said cylinder being beveled outwardly, a cylinder head received on one end of said cylinder, an inwardly opening annular recess between said head and the adjacent end of said cylinder, a fluid pressure inlet in said head communicating with said cylinder, a piston slidably received in said cylinder, a piston rod connected to said piston and projecting at the opposite end of said cylinder, a second cylinder head received at the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one piston, spring means for urging each plunger axially outwardly of said piston, locking detents slidably disposed in said radial apertures, and means for moving said detents outwardly and locking same in outward position comprising a flat surface on the outer end of each plunger, each flat surface merging into an inwardly extending inclined cam surface, each cam surface terminating in a second flat surface disposed radially outward of said first flat surface and a rounded nose portion on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surface on said one plunger will move the associated detent outwardly into the adjacent annular recess to lock said piston against movement and of movement of the nose portion on said last named detent into engagement with said second flat surface will lock said last named detent in outward position and upon admission of fluid pressure into one said end of said cylinder said one plunger will be forced inwardly to release said last named detent to permit inward movement thereof and movement of said piston to opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement from the opposite end.

5. A double acting fluid pressure actuator and locking means comprising an elongated hollow cylinder, a cylinder head received on one end of said cylinder, an inwardly opening annular recess between said head and the adjacent end of said cylinder, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, locking detents slidably disposed in said radial apertures, beveled surfaces on the outer ends of said detents for engaging the beveled end surfaces on said cylinder and means for moving said detents outwardly and locking the same in outward position comprising a flat surface on the outer end of each plunger, each flat surface merging into an inwardly extending inclined cam surface, each cam surface terminating in a second flat surface disposed radially outward of said first flat surface and a rounded nose portion on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surface on said one plunger will move the associated detent outwardly into the adjacent annular recess to lock said piston against movement and movement of the nose portion on said last named detent into engagement with said second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite ends of said piston and the associated detent outwardly and lock the same in the annular recess at the opposite end of said cylinder to lock said piston against movement from the opposite end.

6. A double acting fluid pressure actuator and locking means comprising an elongated hollow cylinder, a cylinder head received on one end of said cylinder, an inwardly opening annular recess between said head and the adjacent end of said cylinder, a fluid pressure inlet in said head communicating with said cylinder, a piston slidably received in said cylinder, a piston rod connected to said piston and projecting from the opposite end of said cylinder, a second cylinder head received on the opposite end of said cylinder and surrounding said piston rod, a second inwardly opening annular recess between said second head and the adjacent end of said cylinder, a second fluid pressure inlet in said second head communicating with said cylinder, a central axial bore in each end of said piston, a radial aperture in each end of said piston communicating with said bore, a second bore in each end of said piston concentric with said first bore and of smaller diameter, a plunger slidably disposed in each of said second bores, a fluid pressure passage in said piston between the first bore in one end of said piston and the second bore in the opposite end of said piston, a second fluid pressure passage between the first bore in said opposite end of said piston and the second bore in said one end of said piston, spring means for urging each plunger axially outwardly of said piston, locking detents disposed in said radial apertures, means for moving said detents inwardly upon movement of said piston in either direction and means for moving said detents outwardly and locking the same in outward position comprising a flat surface on the outer end of each plunger, each flat surface merging into an inwardly extending inclined cam surface, each cam surface terminating in a second flat surface disposed radially outward of said first flat surface and a rounded nose portion on the inner end of each detent, said rounded nose having a cross-section which is substantially, but not exactly, equal to that of a semi-circle, and engaging said first flat surface when said detents are in inward position, whereby with said piston at one end of said cylinder and upon outward movement of one plunger the cam surface on said one plunger will move the associated detent outwardly into the adjacent annular recess to lock said piston against movement and movement of the nose portion on said last named detent into engagement with said second flat surface will lock said last named detent in outward position and upon admission of fluid pressure into said one end of said cylinder said one plunger will be forced inwardly to release said last named detent to permit inward movement thereof and movement of said piston to the opposite end of said cylinder, the spring at the opposite end of said piston and fluid pressure through the passage to the second bore at said opposite end of said piston serving to move the plunger at said opposite end of said piston and the associated detent outwardly and lock the same in the annular recess at the opposite end of said cylinder to lock said piston against movement from the opposite end.

References Cited

UNITED STATES PATENTS

| | | | |
|---|---|---|---|
| 2,295,961 | 9/1942 | Meyer | 92—24 X |
| 3,008,454 | 11/1961 | Wilkins | 92—24 X |
| 3,107,582 | 10/1963 | Royster | 92—24 |

MARTIN P. SCHWADRON, *Primary Examiner.*

SAMUEL LEVINE, *Examiner.*

I. C. COHEN, *Assistant Examiner.*